INVENTOR
ROBERT K. CATTERSON
BY
Barnes, Kisselle, Raisch & Choate
ATTORNEYS

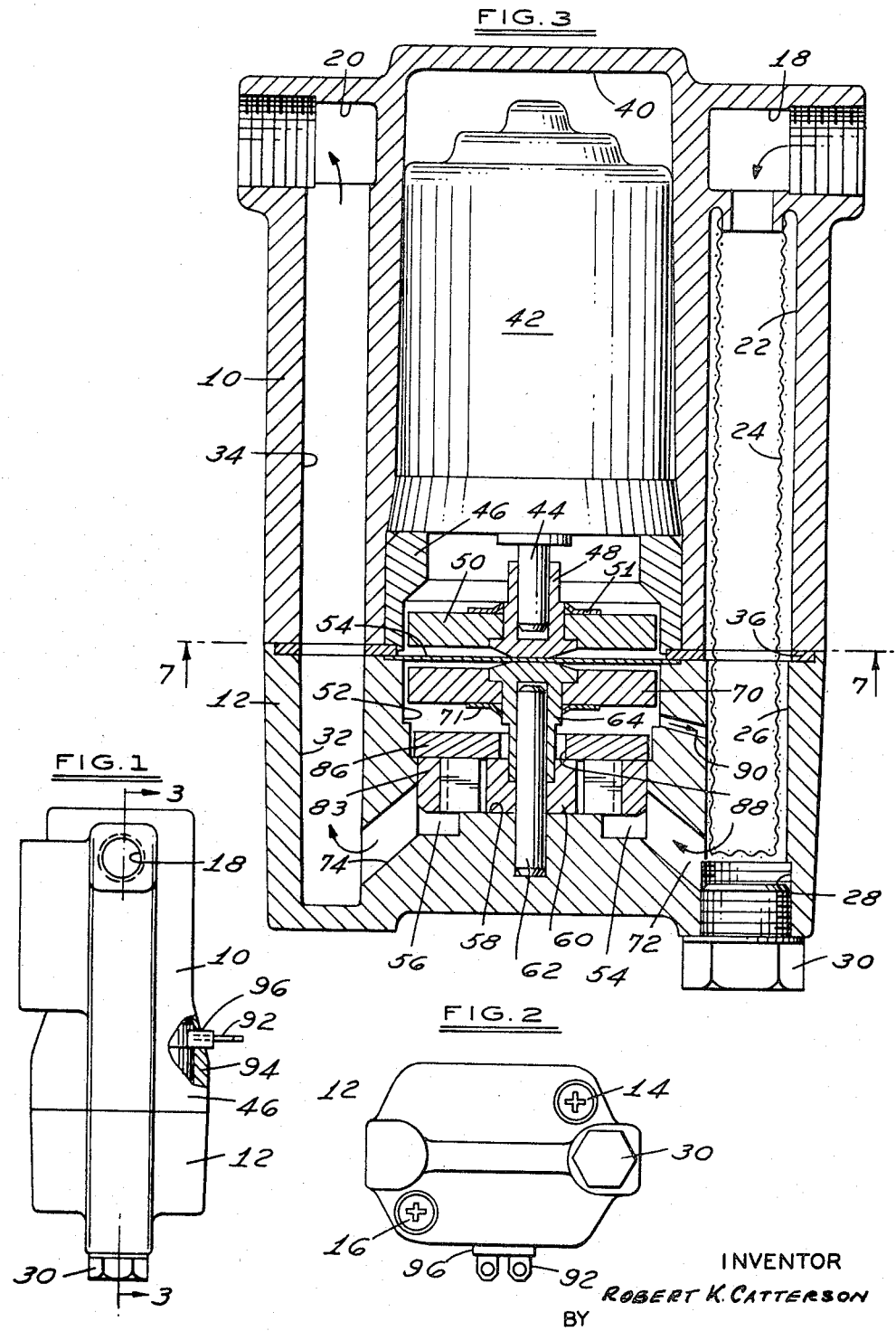

United States Patent Office 3,415,195
Patented Dec. 10, 1968

3,415,195
MAGNETIC DRIVE PUMP
Robert K. Catterson, Columbus, Ohio, assignor to Walbro Corporation, Cass City, Mich., a corporation of Michigan
Filed June 5, 1967, Ser. No. 643,704
6 Claims. (Cl. 103—118)

ABSTRACT OF THE DISCLOSURE

This invention relates to a magnetic drive pump wherein an electrical powered drive rotor is sealed from a pump chamber and transmits by electromagnetic forces a rotary drive to a pump impeller in the pump chamber, the invention relating specifically to a two-piece housing with facing motor and pump chambers and a pump passage arrangement to facilitate priming, the bearing relationship of the parts with respect to the sealing membrane, and to an included magnetic relief valve which in conjunction with magnetic parts completes the pump housing and forms also a by-pass in the event of build-up of pressure beyond a predetermined amount.

*Background of invention*

Pumping devices utilizing a magnetic drive are known in such patents as: Whitted, 2,429,114, Oct. 14, 1947; Dickey 2,779,513, Jan. 29, 1957; Hudson, 2,885,126, May 5, 1959.

The present invention is directed to the provision of a simplified magnetic pump construction utilizing a separate drive chamber and pumping chamber on either side of a sealing membrane but with a simplified housing utilizing registering passages together with a magnetic relief valve. The entire construction including the motor, the drive rotors, pump rotors is held together with two fastening devices such as screws and the inlet and outlet of the system are located at one end where they are conveniently accessible.

In addition, the system is provided with a simple connect for the electrical drive. It is thus an object of the invention to provide a simplified housing for a magnetic torque pump and an improving bearing system which is less expensive and still able to accept the magnetic pressure forces without undue wear against the membrane between the chamber.

Other objects and features of the invention relating to details of construction and operation will be apparent in the following description and claims in which the principle of the invention is disclosed together with the best mode contemplaed for accomplishing the result.

Drawings accompany the disclosure and the various views thereof may be briefly described as:

FIGURE 1, a side elevation of the exterior of the pump housing.

FIGURE 2, an end view of the pump housing.

FIGURE 3, a sectional view on line 3—3 of FIGURE 1.

Figure 4:
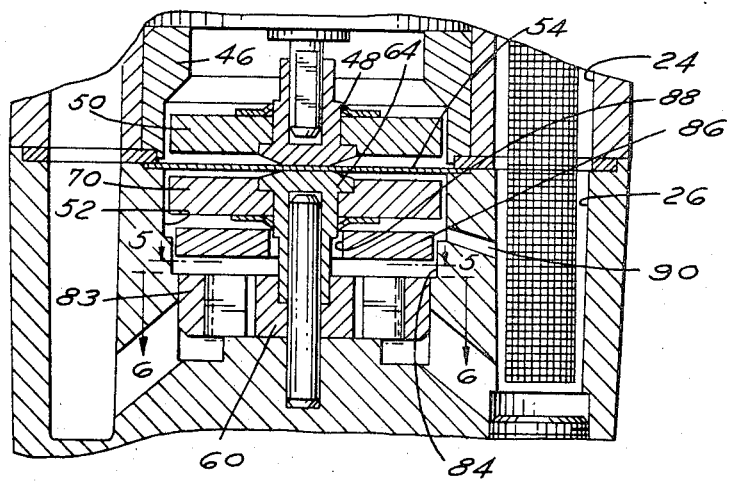

FIGURE 4, a partial section illustrating the manner in which the relief valve operates.

Figures 5, 7:
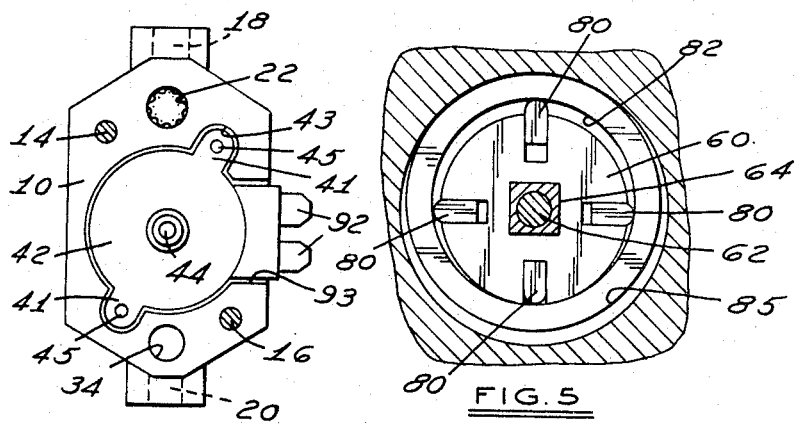

FIGURE 5, a sectional view on line 5—5 of FIGURE 4.

Figures 6, 8:
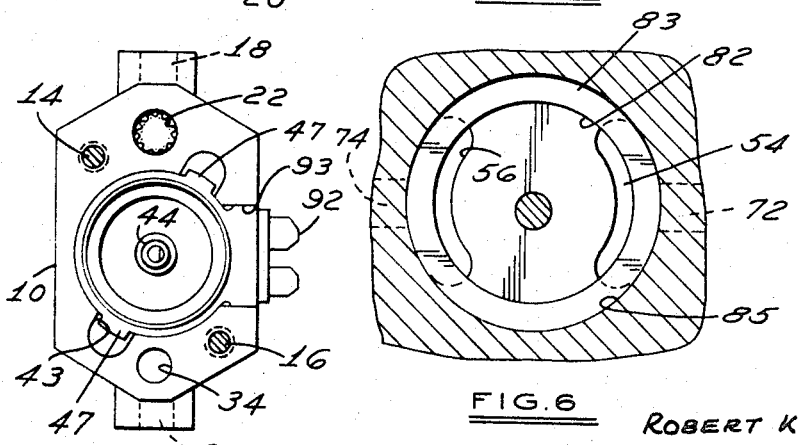

FIGURE 6, a sectional view on line 6—6 of FIGURE 4 with the pump rotor removed.

FIGURE 7, a sectional view on line 7—7 of FIGURE 3 with parts removed to show the motor.

FIGURE 8, a sectional view on line 7—7 of FIGURE 3, with rotor removed.

With reference to the drawings, it will be seen that the pump comprises two housings 10 and 12 which are connected together by two screws 14 and 16. The pump housing 10 has an inlet port 18 and an outlet port 20 on the opposite side of the body. It will be noted from FIGURE 3 that the inlet port 18 has a 90° turn to a straight passage 22 which contains a filter tube 24, the passage 22 extending downwardly to register it with a passage 26 in housing 12 which terminates at an opening 28 closed by a plug 30.

Thus, the filter screen can be readily removed by removing the plug 30. On the other side of the housing 12 is a symmetrically located passage 32 which registers with a vertical passage 34 leading to the outlet 20. The housings are so arranged that a sealing gasket 36 of oval shape is recessed slightly into housing 12 to seal the housings together, the gasket being perforated to permit registry of the passages 22–26 and 32–34. The upper housing 10 has a central chamber 40 which is perferably circular in cross-section to receive a housing 42 containing an electric motor having a drive shaft 44 extending therefrom. The motor 42 has two opposed apertured lugs 41 which recess in channels 43 (FIGURE 7) and which fit over pins 45 at the base of the channels. Thus, the motor is secured against rotation.

The motor is retained in position by a ring 46 at the bottom of the opening 40 having two lugs 47 which are received in channels 43 to prevent improper insertion, this ring being held in place by the inner periphery of the gasket 36. The motor shaft 44 has a flat on one side which mates with the flat in a nipple bushing 48 which is slipped over one end of the shaft. This bushing is preferably formed of a high density plastic and impregnated with a lubricant, as, for example, a graphite filled nylon material, and the bushing carries a magnetic disc 50 held by a spring retainer washer 51 with a suitable driving connection between the bushing 48 and the disc or rotor 50. The bushing 48 preferably has a free-slip fit axially on the shaft 48 so that it may shift on the shaft.

The housing 12 also has a central recess 52 at the top of which is located a separator plate or membrane 54, the membrane being recessed at its edges into the annular rim at the top of the opening 52 and underlying the inner annular edge of the sealing gasket 36. Thus, each housing has a blind central chamber mouth to mouth with the other. The chamber 52 at its lower end has two kidney-shaped openings 54 and 56 serving as inlet and outlet openings for the chamber and at the bottom of the recess 52 is a platform surface 58 which serves as a bearing surface for a pump rotor 60, this rotor being preferably formed of a non-magnetic material and mounted on a shaft 62 carried in a vertical bore eccentrically located with respect to a pump chamber 82 (FIGURE 5) in the base of the housing 12. At the top of the shaft 62 is a nipple bushing 64 similar to bushing 48 on which is mounted, in a driving connection, a magnetic rotor disc 70 and spring retainer washer 71 positioned just below the membrane plate 54.

It will be noted that the two bushings 48 and 64 are slightly tapered to a flat end which bears respectively against the opposite sides of the diaphragm 54. These reduce the area contact with the plate and also serve to space the two magnetic rotors 50 and 70 from each other on opposite sides of the diaphragm.

It will be seen from FIGURE 3 that the lower end of passage 22–26 is connected to the inlet recess 54 through a short passage 72 and similarly at the other side of the pump the passage 32–34 is connected to the outlet recess 56 by a short passage 74.

The sectional view in FIGURE 5 illustrates the pump rotor 60 with sliding vanes 80 which have rounded ends which bear against the side of an eccentric chamber 82 formed by a cam ring insert 83 in which the pump rotor moves. The ring insert is preferably press fitted into a recess 85 and is formed of a megnetic material such as iron or steel or a magnetic alloy with good wearing qualities. Also in FIGURE 5 is shown a sectional view of shaft 62 and the square cross-section of the lower end of the nipple bushing 64 which interfits with a square opening in the recess in the rotor. In FIGURE 6 a view of the eccentric chamber 82 within ring 83 is shown without the rotor illustrating the kidney-shaped recesses 54 and 56 and the inlet port 72 and the outlet port 74. In a circular recess 84 directly above the chamber 82 there is located a magnetic ring 86 (see FIGURE 4). This ring has an opening 88 which is slightly smaller than the solid center portion of the disc 60 and larger than ring 83 so that when the plate 86 is resting on the rotor, it will form a substantial seal and serve as an upper wall of the pumping chamber. This ring 86 is magnetically attracted to the iron cam ring 83 and is slightly smaller in diameter than the recess 84 to permit liquid by-pass into larger chamber 52. It will be seen that the ring 83 or the ring 86 or both may be magnetized to create the magnetic attraction necessary for the function to be described. By "magnetic attraction" is meant any magnetic force which urges ring 86 toward the rotor.

Above the chamber 84 is the larger chamber 52 in which rotates the magnetic disc 70. At the bottom of this chamber 52 is a small bleed hole 90 which leads from these chambers 84 and 52 back to the passage 26.

In FIGURE 1, electrical contacts 92 project through the wall of the housing 10. These contacts which consists of double prongs leading to the motor winding are insertable through a slot in the wall of the housing 10 which is subsequently closed by a block-like projection 94 (FIGURE 8) on the ring 46 so that the projection 94 presses upwardly against the insulation 96 of the electrical connections and the remainder of the ring bears against the motor housing to hold the motor solidly in place.

In the operation of the device, it will be seen that electrical power input through the contacts 92 leading to the motor will cause rotation of the magnetic rotor 50 mounted on the bushing 48 which is driven through a flat on the shaft 44. As previously indicated, the bushing 48 has a sliding fit on the shaft 44 so that changes in the axial location of the armature of the motor will not increase or decrease pressure of the rotor plate against the diaphragm 54. The graphite-filled nylon bushing has a good bearing relation with the diaphragm plate 54 which is, of course, formed of metallic, non-magnetic material. The magnetic forces of the rotating plate 50 will transmit through the diaphragm 54 to the drive rotor 70 which is freely rotatable on the stud shaft 62. The bushing 64 has a square end connection with the pump rotor 60 and the rotation of this rotor will cause a decrease in pressure in chamber 54 and increase in pressure in chamber 56 by reason of the vanes 80 which are rotated in the eccentric chamber 82. Thus, fuel entering port 18 will flow downwardly through the passage 22-26 after passing through the filter screen 24 and into the passage 72 leading to the rotor. It will then be moved around the rotor to the outlet passage 74 and the upright passage 32-34 to the outlet 20. Bushing 64 is also free to slip on the stud shaft 62 so that the bushing, which again is a graphite filled nylon material, can ride against the membrane 54.

In the event that pressure develops in the outlet of the pump to a greater degree than is desired, the magnetic cover plate 86 will lift away from the ring 83 allowing the liquid being pumped to pass upwardly into the chamber 52 and out through the calibrated opening 90. The size of the by-pass opening 90 determines the maximum outlet pressure in conjunction with the degree of attraction of the magnetic plate 86 to the rotor 60. This can be readily determined for any particular by-pass pressure desired.

In assembly of the pump, it will be seen that when the housings 10 and 12 are separated, the main opening 40 will receive the motor 42, its entry into the housing being limited by the lugs 41 and the projecting terminals 92 moving into the slot 93 in the side wall of the housing. Following the introduction of the motor, the ring 46 can be inserted with the block projection 94 filling the slot 93 and moving against the insulation 96 supporting the terminals 92. The rotor 50 is then slipped onto the shaft 44. At the other end, in housing 12, the rotor 60 is slipped onto the shaft 62, the cover plate 86 is inserted in recess 84, and the rotor 70 with its bushing 64 is placed on the pin 62. Upon the introduction of the diaphragm 64 and the gasket 36 the parts can be assembled face to face with the central chambers mouth to mouth by the use of the two screws 14–16. The introduction of the tubular filter member 24 into the passage 24–26 and the insertion of the plug 30 will complete the assembly. The pump can be made in varying sizes and cacapities depending on the r.p.m. of the motor and the volume of the pumping chamber utilized.

It will be noted that the pump as shown in FIGURE 3 essentially a U-shaped construction including the inlet and outlet ports together with the down passage at the inlet side and the up passage at the outlet side. This maintains a certain amount of fluid in the pumping chamber which greatly aids the priming action of the pump once it has been initially primed since the pump will retain a certain quantity of liquid in the U-shaped passage and be ready for immediate action whenever it is turned on. It is desirable that the breakaway torque between the magnetic rotors is somewhat less than the stall torque of the motor can run at full speed until the circuit is for any reason the rotor 70 should fail to turn the magnets will slip in an automatic clutching arrangement and the motor can run at full speed until the circuit is broken.

What is claimed as new is as follows:

1. A liquid motor-pump combination of the type utilizing a magnetic drive through an impervious membrane positioned to separate the pumping chamber from the motor chamber in which the motor-pump housing comprises a pair of housings each with a central chamber for receiving the motor and pump respectively, the motor housing having an inlet and outlet at one end opposite the other housing, and each housing having a pair of passages extending from said inlet and outlet respectively in said motor housing along said chambers to the pump chamber to provide with said pump chamber a U-shaped passage to assist in priming of said pump.

2. In a liquid motor-pump combination of the type utilizing a magnetic drive from motor to pump through rotating magnets on opposite sides of an impervious membrane to separate the pumping chamber and the motor chamber, that improvement which comprises a motor housing and a pump housing each having blind central chambers respectively containing a motor and a pump and positioned with the openings mouth to mouth separated by a membrane, and each having a pair of passages aligned to form a pair of passageways extending substantially the length of said combined chambers to form an inlet and outlet passage to the pump originating and terminating at the blind end of said motor housing and having connections to the pumping chamber at the blind end of the pump housing.

3. A motor-pump as defined in claim 2 in which the rotating magnet in the pumping chamber is mounted on a stationary shaft anchored in the blind end of said pumping chamber and passing through said rotor and said disc, said shaft serving as a central bearing for a pump rotor, and means mounted and rotatable on said shaft for connecting in a driving relation a rotating magnet and said pump rotor through said disc.

4. A motor-pump as defined in claim 2 in which the rotating magnets are each supported on a shaft for axial movement relative thereto, and a combination bearing and mount interposed between said magnets and said respective shafts comprising a nipple-like element of high density plastic impregnated with a lubricant having a portion slip fitted over said shafts and a nose portion bearing against said membrane.

5. A motor-pump combination as defined in claim 2 in which a motor assembly is removably housed in said central chamber of said motor housing, said motor assembly having terminals projecting from the side thereof, a slot formed in the wall of said motor housing to permit the insertion of said terminals as said motor is inserted in said motor chamber, and means to retain said motor assembly in said motor chamber and to fill said slot while forming a recess for a rotating magnet which comprises a ring insertable axially into the mouth of said motor chamber to bear against said motor assembly and a projection on one side of said ring to slide into and fill said slot and bear against said terminals projecting from said motor chamber.

6. In a magnetic drive pump wherein rotating magnets on either side of a sealing membrane create a drive for a pump rotor, that improvement in which each magnet is a disc having an out-of-round hole and each is mounted for rotation on a shaft, and a nipple bushing of high density plastic impregnated with a lubricant having a closed end to bear against the membrane in a bearing relationship interposed between each shaft and each disc having a shank portion to interfit with the hole in each disc.

References Cited
UNITED STATES PATENTS

| | | | |
|---|---|---|---|
| 2,429,114 | 10/1947 | Whitted | 103—87 |
| 2,699,476 | 1/1955 | Gorn | 310—104 |
| 2,779,513 | 1/1957 | Dickey | 103—118 |
| 2,885,126 | 5/1959 | Hudson | 103—87 |
| 2,968,248 | 1/1961 | Carter | 103—87 |
| 2,996,994 | 8/1961 | Wright | 103—87 |
| 3,238,884 | 3/1966 | Wright | 103—118 |

FRED C. MATTERN, JR., *Primary Examiner.*

WILBUR J. GOODLIN, *Assistant Examiner.*

U.S. Cl. X.R.

203—87; 64—28, 192—84; 310—104.